United States Patent [19]

Tohya et al.

[11] Patent Number: 4,698,517

[45] Date of Patent: Oct. 6, 1987

[54] POWER SUPPLY SOURCE CONTROL SYSTEM

[75] Inventors: Hirokazu Tohya; Tooru Kido, both of Tokyo, Japan

[73] Assignee: NEC Corporation, Tokyo, Japan

[21] Appl. No.: 649,683

[22] Filed: Sep. 12, 1984

[30] Foreign Application Priority Data

Sep. 13, 1983 [JP] Japan ............................... 58-168708

[51] Int. Cl.[4] ................................................ H02J 9/00

[52] U.S. Cl. ........................................ 307/43; 307/64; 307/66; 307/87; 364/492

[58] Field of Search ....................... 307/43, 44, 48, 54, 307/61, 63, 64, 65, 66, 69, 71, 77, 80, 85, 86, 87; 364/492; 290/4 R, 2

[56] References Cited

U.S. PATENT DOCUMENTS

| | | | |
|---|---|---|---|
| 3,842,249 | 10/1974 | Geyer et al. | 307/86 X |
| 4,204,249 | 5/1980 | Dye et al. | 307/64 X |
| 4,275,311 | 6/1981 | Agazzone et al. | 307/86 X |
| 4,305,129 | 12/1981 | Yannone et al. | 364/492 |
| 4,384,213 | 5/1983 | Bogel | 307/80 X |
| 4,400,624 | 8/1983 | Ebert | 307/43 |
| 4,527,071 | 7/1985 | Ausiello | 364/492 X |
| 4,539,487 | 9/1985 | Ishii | 307/44 |

*Primary Examiner*—William M. Shoop, Jr.
*Assistant Examiner*—Shik Luen Paul Ip
*Attorney, Agent, or Firm*—Schwartz, Jeffery, Schwaab, Mack, Blumenthal & Evans

[57] ABSTRACT

A system-power-supply-source controller is used for controlling and monitoring the operations of a plurality of power supply sources associated with a plurality of logical units. The logical units each comprise power supply control units. Separate and independent power supplies are provided for each power supply control unit and its respective logical unit. The system-power-supply-source controller transmits and receives data to and from control units associated with each logical unit. A data signal line is provided for transferring data between the system-power-supply-source controller and the control units. An interruption line is arranged between the controller and the logical units, and each control unit produces a signal on the interruption line to inform the system-power-supply-source controller that its associated power supply source has malfunctioned.

9 Claims, 13 Drawing Figures

POWER SUPPLY SOURCE CONTROL SYSTEM

BACKGROUND OF THE INVENTION

The present invention relates to a power supply source control system for controlling a plurality of independent power supply sourced included in a plurality of logical units.

There has been proposed a system for controlling and monitoring the operations of a plurality of power supply sources provided in a plurality of loical units using a system-power-supply-source controller. In such a system, each logical unit includes a plurality of functional blocks and the power supply source comprises a plurality. of power supply portions, each of which supplies a power source voltage to a corresponding functional block. Each logical unit is further provided with signal lines transmitting control signals for instructing the power-on and power-off operations and interruption signals for indicating malfunction occurrences of power supply sources. The number and length of such signal lines inevitably become quite extensive, presenting problems such as increasing the size of the controller and pushing the cost up. Further, as the number of control signals increases, the number of signal lines must be increased. This requires remodelling of the interface between the controller and each logical unit, causing almost insurmountable difficulty in practice.

One object of the present invention is, therefore, to provide a power supply source control system free from the above-mentioned disadvntage in the known system.

SUMMARY OF THE INVENTION

According to one aspect of the present invention, there is provided a power supply source control system which comprises: a plurality of logical units, each having power supply control means assigned with a specific address; a first power supply source provided in each of the logical units and operation-controlled by the control means for supplying a first power source voltage to the logical unit; a second power supply source provided in the control means for supplying a second power source voltage to the control means independently from the first power supply source; a system-power-supply-source controller for transmitting and receiving a plurality of data including address information to and from the control means so that said first power supply source is controlled and monitored; at least one data signal line for transferring the data between the controller and the control means; and an interruption line for informing the controller of the occurrence of a malfunction in at least one of the first and the second power supply sources.

BRIEF DESCRIPTION OF THE DRAWINGS

The features and advantages of the present invention will become apparent from the following description when taken in conjunction with the accompanying drawings in which.

In the drawings, the same reference numerals represent the same structural elements.

DETAILED DESCRIPTION OF THE PREFERRED EMBODIMENTS

Figure 1:
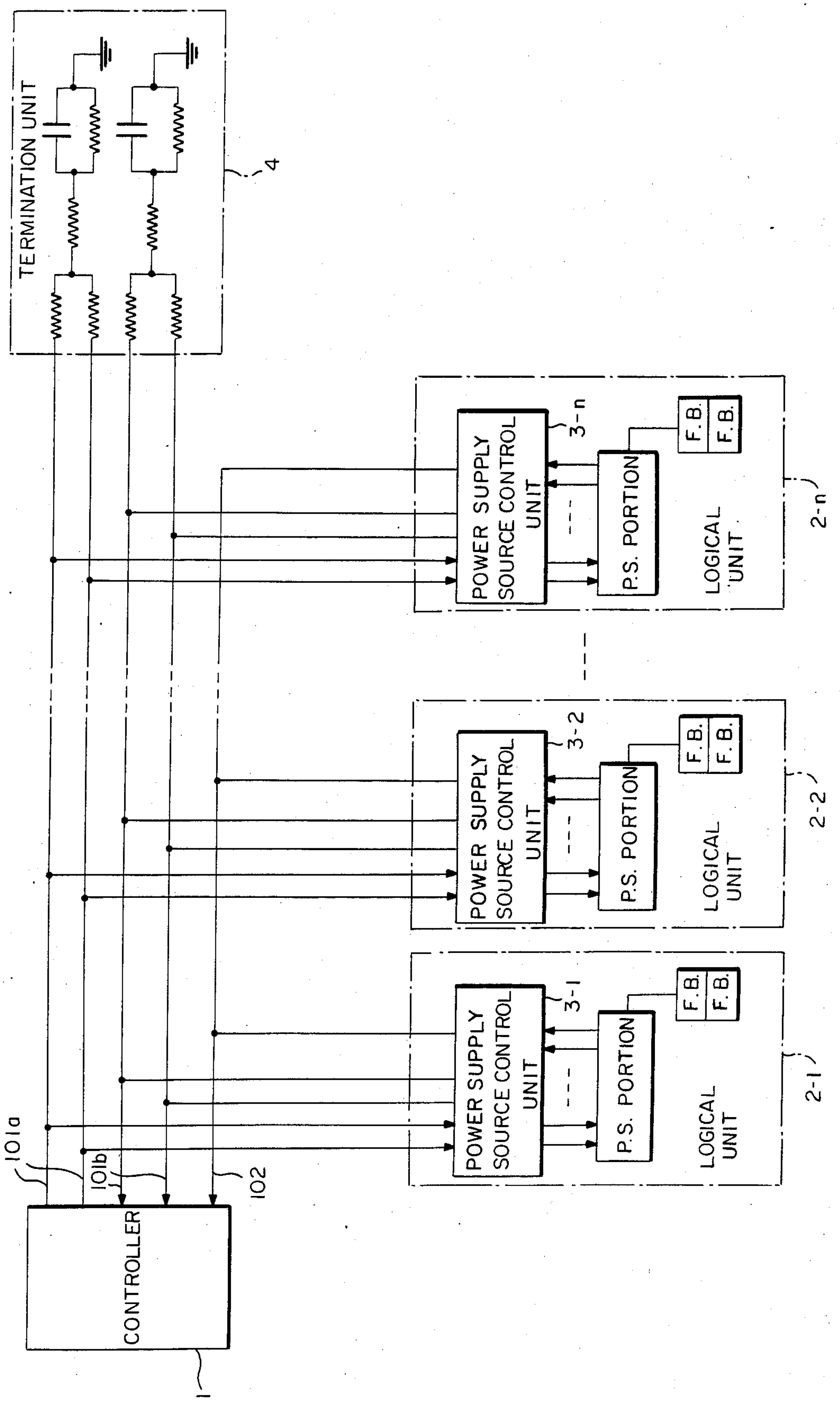
FIG. 1 is a block diagram of an embodiment of the invention.

Referring now to FIG. 1, an embodiment of the invention comprises a system power supply source controller 1, a termination unit 4 having a plurality of resistors and capacitors, a pair of transmitting lines 101*a* and a pair of receiving lines 101*b* which connect the controller 1 and the unit 4, an interruption line 102, n (a positive integer) logical units 2-1 through 2-n, and n power supply source control blocks 3-1 through 3-n provided in the units 2-1 through 2-n. Each of the units 2-1 through 2-n further includes a plurality of functional blocks F.B. (for instance, a plurality of electronic circuit packages). The controller 1 functions to form various control data for controlling a plurality of power supply portions (P.S. portions) provided for each functional block and to transmit those data to at least one control block via the lines 101*a* in bit serial. Each of the units 2-1 through 2-n is assigned with a specific address.

Figure 2:
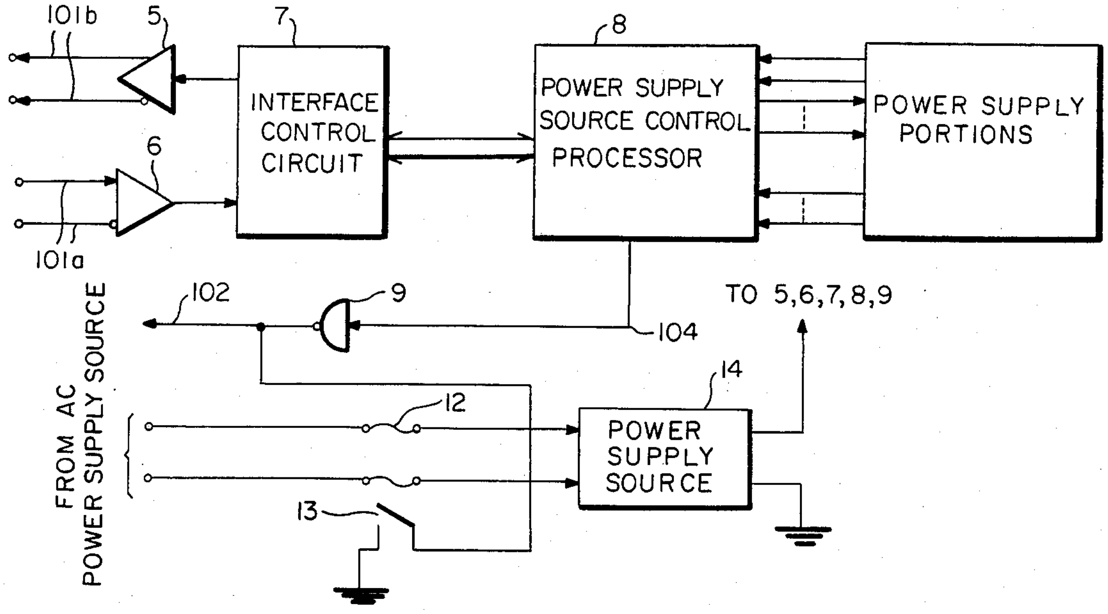
FIG. 2 is a circuit diagram of a power supply source control block.

Referring to FIG. 2, each of the blocks 3-1 through 3-n comprises a driver 5, a receiver 6, an interface control circuit 7, a power supply source control processor 8, a NOT circuit 9, a fuse 12 connected to an AC (alternative current) power supply source (not shown), an alarm switch circuit 13 corresponding to the fuse 12, and a DC (direct current) power supply source 14 which converts the input AC voltage given from the AC power supply source into a DC voltage and supplies it as a power source voltage to the processor 8, the circuit 7, the circuit 9, the driver 5, and the receiver 6. The driver 5 and the receiver 6 may be composed of SN 75174 and SN 75175 intergrated circuits available from Texas Instruments Inc. under the trade names Quad Differential Line river and Quad Differential Line Receiver respectively. The interface control circuit 7 may be a μPD 8251AF available from NEC Corp. under the trade name USART. The processor 8 may be a μPD 8039 HLC available from NEC Corp. under the trade name 1 Chip 8 Bit Microcomputer.

In FIG. 2, the various control data from the controller 1 are inputted in the circuit 7 via the receiver 6, and then converted from serial to parallel by the circuit 7 to be inputted at the processor 8. The processor 8 analyses the types of the control data which have been inputted from the circuit 7 in bit parallel and transmits a control signal corresponding to the control data to the power supply portion. Monitoring signals, corresponding to predetermined monitored items at each power supply portion, are fed from each power supply portion to the processor 8, data-processed at the processor 8, transmitted to the controller 1 via the circuit 7, the driver 5 and the lines 101*b* as monitoring data corresponding to the above-mentioned monitored items, and used as the operation monitoring information in the controller 1.

Figure 3:
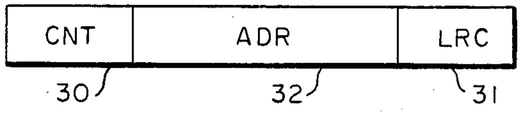
FIG. 3 is a diagram of a format of a control data signal.

Referring now to FIG. 3, each of the control data formed by the controller 1 consists of a command field 30 of one byte, an address field 32 of two bytes, and a horizontal parity field 31 of one byte.

Figure 4A:
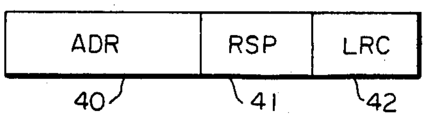
FIGS. 4A and 4B are diagrams of formats of a first and a second response data signal respectively.

Referring to FIG. 4A, first response data generated at each of the blocks 3-1 through 3-n is made up of an address field 40 of two bytes, a response field 41 of one byte and a horizontal parity field 42 of one byte.

Figure 4B:
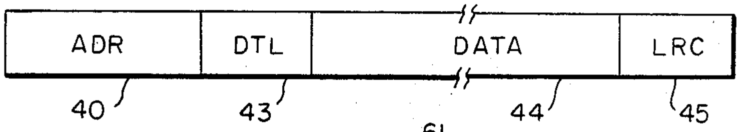

Referring to FIG. 4B, second response data generated at each of the blocks 3-1 through 3-n is composed of an address field 40 of two bytes, a data length field 43 of one byte, a information field 44 having the number of bytes corresponding to the value indicated in the data length field 43, and a horizontal partiy field 45 of one byte.

Figure 5A:
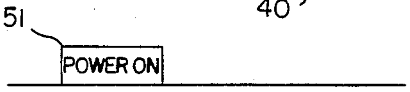
FIGS. 5A and 5B are diagrams describing a power-on operation.
Figure 5B:
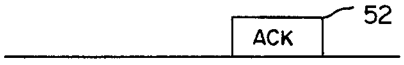

A power-on operation of the embodiment will now be described referring to FIGS. 5A and 5B. The controller 1 generates control data 51 (FIG. 3). The data 51 has a command field 30 to specifies a power-on command and an address field 32 which specifies the address of the logical unit i(=2-1–2-n) to which the power is to be turned on. The controller, then, transmits the data 51 to the lines 101*a*. Each of the blocks 3-1 through 3-n in each of the units 2-1 through 2-n is provided with a processor 8 to receive the data 51 via the receiver 6 and the circuit 7. The processor 8 compares its own specific address with the address field of the data 51 and, if they are equal, analyses the command field 30 to send a power-on command to the power supply portions. As soon as the power supply portions inform the processor 8 of the completion of the power-on command, the processor 8 transmits a first response data 52 (FIG. 4A), which has a response field 41 specifying information indicative of the power-on command completion, to the controller 1 via the circuit 7, the driver 5 and the receiving lines 101*b*. In this manner, the controller 1 can be informed that the unit i has been supplied with power.

Figure 6A:
FIGS. 6A and 6B are diagrams describing a power-off operation.
Figure 6B:
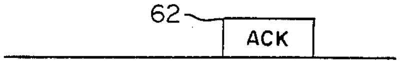

Referring now to FIGS. 6A and 6B, a power-off operation will be described. The explanation will be very simple and brief as the operation is almost similar to the abovementioned power-on operation. First, the controller 1 transmits control data 61 to the lines 101*a*. The data 61 has a command field 30 to specifying a power-off command and an address field 32 specifying the address of the unit i to which the power is to be cut off. The processor 8 of the unit i commands the power-off operation with this data 61 and, after the power-off command has been completed, transmits first response data 62 to the controller 1. The data 62 has a response field 41 specifying information indicative of the completion of the power-off command.

The operation, when a malfunction occurs at some power supply portion in some logical unit, will be described below. In response to a malfunction of the power supply portion, a monitoring signal indicative of such occurrence of a malfunction is given from a corresponding power supply portion to the processor 8. In response to the monitoring signal, the processor 8 produces a high-level signal assuming a constant higher voltage to the signal line 104. The circuit 9 converts the high-level signal into a low-level signal assuming a constant voltage lower than the high-level signal and outputs the thus converted low-level signal to the interruption line 102. As a result, the controller 1 is informed of the fact that any one of the units 2-1 through 2-n has malfunctioned. With the malfunction of a power supply source 14, the fuse 12 will become blown off to close the switch circuit 13. Accordingly, the voltage of the interruption line 102 assumes a low voltage level (earth level) almost equal to the lower voltage, and the controller 1 is informed of the malfunction of the power supply portion or the supply source 14 at either one of the units 2-1 through 2-n.

Figure 7A:
FIGS. 7A through 7D are diagrams describing operations at the time when a malfunction occurs on a power supply source.
Figure 7B:
Figure 7C:

It is assumd that the power supply portion of the logical unit i has malfunctioned. When the voltage of the interruption line 102 becomes low voltage level as shown in FIG. 7A, the controller 1 inerrogates each of the logical units in order to determine the logical unit where the malfunction occurred. More particularly, the controller 1 produces to the lines 101*a* control data 71 (FIG. 3). The data 71 has an address field 32 specifying the address of the unit 2-1 and a command field 30 specifying an inquiry command. The processor 8 of the control block 3-1 responsive to the data 71, produces first response data 72, which has an information field 44 specifying information indicative of no malfunction, since there is no malfunction in the power supply portions of the unit 2-1. Having received the data 72, the controller 1 is informed of the fact that there is no malfunction in the unit 2-1 and continues to interrogate the next logical unit 2-2. Similar interrogations are made of the subsequent logical units and when the the logical unit i, is interrogated the processor 8 of the unit i produces on the lines 101*b*, first response data 73, which has an information field 44 specifying information indicative of the occurrence of the malfunction at the power supply portion. With this data 73, the controller 1 can detect that the power supply portion of the logical unit i has malfunctioned. When informed of the malfunction in the power supply portion, the controller 1 requests of the control block 3-i monitoring information such as the history of the operational conditions of each power supply portion. Responding to such a request, the block 3-i generates second response data (FIG. 4B), which has an information field 44 to specifying the abovementioned monitoring information, and transmits the same to the controller 1 via the lines 101*b*.

Figure 7D:
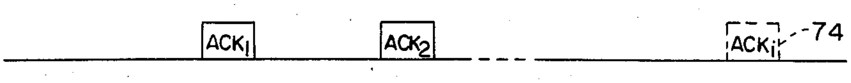

It is now assumed that the power supply source 14 of the logical unit i has malfunctioned. The controller 1 keeps on interrogation each logical unit as mentioned above, and when the logical unit i is interogated, the processor 8 sends back first response data 74 as shown in FIG. 7D if the power supply source 14 is in normal condition. However, since the power supply source 14 has malfunctioned, the processor 8 is not supplied with power source voltage. Consequently, the processor 8 is disabled and cannot respond to the inquiry. If any response has not been sent back from the logical unit for a predetermined duration of time after the inquiry, the controller 1 decides that the malfunction is taking place in the power supply source 14. In this manner, when there is no response sent back from the unit i, the controller 1 can detect that the power supply source 14 of the unit i has malfunctioned.

As described above, since there is no signal line provided for each control data signal or interruption signal in the invention system, the number of signal lines can be remarkably reduced compared to the known systems. The present invention can avoid concentration of signal lines in the controller. Moreover, signal lines can be readily added without rebuilding the signal line connections simply by increasing the number of bits in the command field within the control data.

What is claimed is:

1. A power supply source control system comprising:
   a plurality of logical units, each of which includes:
   electronic functional blocks,
   a power supply source control means assigned with a specific address, a first power supply source operation-controlled by said power supply source control means for supplying a first power source voltage to said electronic functional blocks, a second power supply source for supplying a second power source voltage to said power supply source control means independently of said first power supply source, and means for producing a signal indicative of a malfunction in at least one of said first and second power supply sources;

a system-power-supply-source controller for transmitting and receiving a plurality of data including address information to and from each said power supply source control means so that said first power supply source of each of said logical units is controlled and monitored;

at least one data signal line for transferring said data between said controller and all of said power supply source control means; and an interruption line connected between said controller and all logical units to transmit said malfunction signal to said system-power-supply-source controller.

2. A power supply source control system as claimed in claim 1, wherein said controller includes means, in response to a malfunction signal on said interruption line, for interrogating said plurality of power supply source control means by transmitting a series of first data sequences along said at least one data signal line, each first data sequence specifying a different one of said specific addresses.

3. A power supply source control system as claimed in claim 2, in which each said power supply source control means includes means for comparing the address information included in said first data sequence with said assigned specific address, and if they are equal, transmitting to said controller via said at least one data signal line a second data sequence including information indicative of any malfunction occurrence in said associated first power supply source, or information indicative of no malfunction occurrence.

4. A power supply source control system as claimed in claim 3, in which said controller includes means for detecting that a malfunction has taken place in the second power supply source of an associated power supply source control means when said first data sequence is transmitted specifying the assigned specific address of the associated power supply source control means associated with the second power supply in which a malfunction has taken place, and no second data sequence is received by said controller for a predetermined duration of time.

5. A power supply source control system as claimed in claim 1, in which said at least one data signal line comprises a first data signal line for transferring data from said controller to said plurality of power supply source control means, and a second data signal line for transferring data from said plurality of power supply source control means to said controller.

6. A power supply source control system as claimed in claim 1, in which said data are transferred bit-serially via said at least one data signal line.

7. A power supply source control system as claimed in claim 1, in which said first power supply source associated with each said logical unit comprises a plurality of power supply portions provided for supplying said first power source voltage to said functional blocks contained in each logical unit.

8. A power supply source control system as claimed in claim 1 wherein said interruption line comprises only a single interruption line connected between said controller and all of said logical units.

9. A power supply source control system as claimed in claim 1 wherein said second power supply source includes at least one fuse and said signal producing means of each associated power supply source control means comprises means for monitoring the fuse of the associated second power supply and producing said signal when said fuse has blown.

* * * * *